US010525656B2

(12) United States Patent
Dietz et al.

(10) Patent No.: US 10,525,656 B2
(45) Date of Patent: Jan. 7, 2020

(54) HONEYCOMB CORE, METHOD OF PRODUCING A HONEYCOMB CORE, AND SANDWICH PANEL COMPRISING A HONEYCOMB CORE (71) Applicant: MAGNA STEYR Fahrzeugtechnik AG & Co KG, Graz (AT)

(72) Inventors: Wolfgang Dietz, Pirching (AT); Christoph Krammer, Deutschlandsberg (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 289 days.

(21) Appl. No.: 15/627,764

(22) Filed: Jun. 20, 2017

(65) Prior Publication Data
US 2017/0291383 A1  Oct. 12, 2017

Related U.S. Application Data (62) Division of application No. 13/884,616, filed as application No. PCT/EP2011/069556 on Nov. 7, 2011, now Pat. No. 9,731,470.

(60) Provisional application No. 61/411,615, filed on Nov. 9, 2010.

(51) Int. Cl.
*B32B 3/12* (2006.01)
(52) U.S. Cl.
CPC ............ *B32B 3/12* (2013.01); *B32B 2605/00* (2013.01); *Y10T 428/24149* (2015.01)

(58) Field of Classification Search
None
See application file for complete search history.

(56) References Cited

U.S. PATENT DOCUMENTS

| 4,284,457 A | 8/1981 | Stonier et al. |
| 5,114,633 A * | 5/1992 | Stewart ................ B29B 15/122 156/180 |
| 5,217,556 A | 6/1993 | Fell |
| 6,245,407 B1 * | 6/2001 | Wang ................ B29D 99/0089 427/207.1 |
| 2002/0045089 A1 | 4/2002 | Kawahara et al. |
| 2003/0190452 A1 * | 10/2003 | Lucas ....................... B32B 3/12 428/116 |
| 2008/0233344 A1 | 9/2008 | Grob et al. |
| 2008/0286522 A1 * | 11/2008 | Khan ....................... B31D 3/02 428/116 |
| 2011/0033671 A1 | 2/2011 | Govang et al. |

FOREIGN PATENT DOCUMENTS

| CN | 101408066 A | 4/2009 |
| EP | 1815969 A1 | 8/2007 |
| WO | 2009045095 A1 | 4/2009 |

* cited by examiner

Primary Examiner — Michael P. Rodriguez
(74) Attorney, Agent, or Firm — Jordan IP Law, LLC; Todd A. Vaughn (57) ABSTRACT A honeycomb core having a lattice structure which includes a resin-impregnated matrix, a method for producing such a honeycomb core, a sandwich panel having such a honeycomb core, and use of such a honeycomb core or such a sandwich panel in automobile construction. The matrix is impregnated inhomogeneously with the resin.

12 Claims, 7 Drawing Sheets

HONEYCOMB CORE, METHOD OF PRODUCING A HONEYCOMB CORE, AND SANDWICH PANEL COMPRISING A HONEYCOMB CORE

CROSS-REFERENCE TO RELATED APPLICATIONS

The present application is a divisional of U.S. patent application Ser. No. 13/884,616 (filed May 10, 2013), which is a National Stage Application of PCT International Application No. PCT/EP2011/069556 (filed on Nov. 7, 2011), under 35 U.S.C. § 371, which claims priority to U.S. Provisional Patent Application No. 61/411,615 (filed on Nov. 9, 2010), which are each hereby incorporated by reference in their respective entireties.

TECHNICAL FIELD

The invention relates to a honeycomb core having a lattice structure which comprises a resin-impregnated matrix. Furthermore, the invention relates to a method of producing such a honeycomb core and a sandwich panel comprising such a honeycomb core.

BACKGROUND

Honeycomb cores and sandwich panels of the type mentioned are known in principle. Such honeycomb cores and sandwich panels are traditionally used in furniture construction, but this technology has also gradually come into use in other fields, for example, in vehicle construction, ship construction, and aircraft construction, or in general where a high component stiffness at low weight is required. In general, the honeycomb core can be manufactured from any arbitrary material. It quite frequently consists of a composite material, in which a resin is intercalated in a matrix.

For example, DE 10 2008 062 678 A1 discloses a sandwich component for this purpose having a honeycomb structure, which is composed of at least two layers connected to one another, wherein the at least two layers of the honeycomb structure are formed from different materials.

Furthermore, DE 10 2005 033 949 A1 discloses an engine hood made of a sandwich panel having internal core parts made of hard foam or honeycomb. The core parts form zones of various hardnesses and/or thicknesses to protect pedestrians. In addition, an intended buckle zone is provided transversely over the entire width of the engine hood, by which weakening of the structure is achieved. The intended buckle zone is the boundary between a front zone having softer core parts and a rear zone having core parts of higher strength.

DE 101 36 898 A1 additionally discloses an engine hood of a motor vehicle, which comprises deformation elements made of a plurality of parts, which are connected to one another via failure points. In the event of a dynamic load, as occurs in the case of a frontal impact, the failure points break, so that the individual parts are displaced against one another without force.

Finally, DE 102 42 185 B3 discloses a plastic panel made of a sandwich material, which is backed at various points with non-adhesive inserts. The adhesion between honeycomb core or foam layer and at least one of the cover layers or reinforcing layers is thus suppressed, which results in a weak point and therefore an intended buckle point in case of crash.

The comparatively complex production is problematic in the case of the honeycomb cores or sandwich panels of known construction.

SUMMARY OF THE INVENTION

The object of the invention is therefore to specify an improved honeycomb core or an improved sandwich panel having such a honeycomb core, respectively. In particular, a possibility is to be specified for controlling the stiffness of such a honeycomb core or such a sandwich plate, respectively.

The object of the invention is achieved with a honeycomb core of the type mentioned at the beginning, in which the matrix is impregnated with the resin in an inhomogeneous manner.

Furthermore, the object of the invention is achieved by a method for producing a honeycomb core having a lattice structure, which comprises a resin-impregnated matrix, wherein the matrix is brought into contact with a resin or a plurality of resins:
  a) only regionally and/or
  b) regionally for different lengths of time and/or
  c) regionally at different strengths.

Furthermore, the object of the invention is achieved by a sandwich panel, which comprises a honeycomb core of the mentioned type and cover layers connected thereto.

It is thus achieved according to the invention that the stiffness of a honeycomb core or a sandwich panel which has such a honeycomb core, respectively, may be set very well. In particular, a honeycomb core or a sandwich panel can be produced, which has different stiffnesses in various regions.

The advantage of the invention is clear in particular if a honeycomb core or a sandwich panel of the type mentioned is used in vehicle construction, for example, as an engine hood or as an interior component. In both cases, it is important that persons are not injured or are not injured severely in the event of an impact on the mentioned components. With the aid of the honeycomb core according to the invention, it is now possible in a simple manner to design an engine hood of a vehicle so it has different stiffnesses. Thus, various zones can be formed, at which in all probability a pedestrian will strike on the engine hood with the legs, with the torso, or with the head if a vehicle runs into him. The same applies for an interior component, for example, a dashboard. Zones of various stiffnesses can also be formed in a simple manner thereon.

For example, an easily producible honeycomb core or its lattice structure, respectively, can comprise polygonal honeycombs, in particular hexagonal honeycombs. In a further easily producible variant of a honeycomb core, the lattice structure comprises corrugated strips, in particular corrugated strips having linear strips arranged between them. In an advantageous embodiment of the invention, the honeycomb core only comprises (such) lattice elements.

The lattice elements consist of a matrix having a resin embedded therein and/or applied thereon, therefore a composite material. "Resin" is understood in this context as a collective term for solid to liquid organic materials. In particular, the matrix can consist of absorbent material, for example, cardboard or fiber woven textiles, fiber braided textiles or fiber knitted textiles made of glass fibers, Kevlar fibers, aramid fibers, carbon fibers or mixtures thereof.

Further advantageous embodiments and refinements of the invention result from the dependent claims and from the descriptions in conjunction with the figures.

It is favorable if the matrix consists of a substantially homogeneous material. The matrix can thus be produced in a simple manner. The inhomogeneity in the honeycomb core is then predominantly caused by the differing impregnation with a resin. "Substantially" in this context means that the matrix can be produced from various materials, for example, from fiber mixtures, but the properties of the matrix in the differently impregnated regions do not fundamentally differ from one another or are not dependent on a different impregnation, respectively.

It is advantageous if the matrix is only regionally impregnated with the resin. Regions of the honeycomb core having different stiffnesses can thus be produced particularly simply.

It is also advantageous if the matrix is impregnated with resin at different strengths. A plurality of degrees of stiffness of the differently impregnated regions can be achieved in this manner. In addition, the stiffness of the honeycomb core can be varied continuously over the honeycomb core.

It is particularly advantageous if the matrix is impregnated using different resins. In this manner, a plurality of degrees of stiffness of the differently impregnated regions can also be achieved, or also properties other than the stiffness can also be varied, respectively. For example, a region impregnated using a first resin can be water-repellent, while in contrast a region impregnated using a second resin is not water-repellent.

It is particularly advantageous if the inhomogeneity is distributed two-dimensionally over the lattice structure. In this manner, zones of different stiffnesses can be formed on the honeycomb core or on the sandwich panel, respectively. For example, an engine hood which comprises such a honeycomb core can be implemented as particularly soft where the probability is particularly high that a pedestrian who the vehicle runs into will strike with his head.

It is also particularly advantageous if the inhomogeneity is distributed over its height. In this manner, for example, progressive or degressive behavior of the honeycomb core in relation to a body penetrating into the honeycomb core or into a sandwich panel having such a honeycomb core can be set. For example, the honeycomb core can be impregnated more and more strongly viewed in the direction of the penetrating body. A resistance which becomes larger and larger (progressive behavior) thus opposes the penetrating body. Similarly, the honeycomb core can also be impregnated less and less strongly as viewed in the direction of the penetrating body. A resistance which becomes smaller and smaller (degressive behavior) thus opposes the penetrating body.

An advantageous method for producing a honeycomb core is provided if the matrix is immersed in the at least one resin. The matrix may thus be impregnated with resin in a simple manner. In addition, the honeycomb core can be regionally impregnated with resin by partial immersion. Furthermore, the movement during the immersion in the resin or during the withdrawal from the resin can be used for the purpose of bringing the honeycomb core regionally into contact with the resin for different lengths of time. In regions which are in contact with the resin for a long time, the resin accumulates to an increased extent, in regions which are only in contact with the resin for a short time, the resin accordingly accumulates to a lesser extent. In this manner, comparatively complex profiles can be implemented in the intensity in which the resin is deposited in the matrix. The mentioned movement can be executed continuously or discontinuously and at constant or varying speed. Of course, the immersion procedure can be repeated using various resins, so that various regions are immersed in different resins in succession. The mentioned regions can also overlap in this case.

Finally, an advantageous method is provided if the matrix is sprayed with the at least one resin. Through variation of the duration and/or the intensity with which various regions of the honeycomb core are sprayed with a resin, inhomogeneous impregnation of the matrix can also be achieved. In particular, various regions can be sprayed successively or also simultaneously with different resins.

In an advantageous variant of the invention, a honeycomb core comprises a lattice structure which consists of a plurality of lattice elements which are connected to one another at nodal points, at which at least one lattice element only loosely touches an adjacent lattice element or at which a gap is provided between them or at which a lattice element is interrupted. This means that many of the lattice elements are not connected to one another. In the scope of the invention, a plurality of "lattice elements" form a "lattice structure" in the geometrical meaning according to the definition, or the "honeycomb core" in the physical sense, respectively. A further parameter for influencing the stiffness of a honeycomb core is therefore available. The honeycomb core is predominantly weakened in relation to a load which acts transversely to an interruption or a gap, while in contrast the stiffness of the honeycomb core hardly decreases in relation to a load acting in parallel to the direction of the interruption or the gap.

It is particularly advantageous if the honeycomb core is implemented in one piece. In this manner, the handling of the honeycomb core and also the production of a sandwich panel are substantially simplified in relation to methods, in the case of which a plurality of honeycomb cores are assembled to form a sandwich panel.

It is advantageous if the honeycomb core comprises at least one nodal point, at which all lattice elements which form this nodal point only touch one another loosely or a gap is provided between them. In this manner, the honeycomb core is particularly soft at the affected point.

Furthermore, it is advantageous if, at least between two adjacent nodal points, lattice elements extending in parallel only touch one another loosely or a gap is provided between them. A further parameter for controlling the stiffness of a honeycomb core thus results, in the case of which lattice elements are typically flatly glued to one another. This can be the case, for example, if the honeycomb core is constructed from individual honeycombs (for example, hexagonal honeycombs), which are glued to one another. If individual lattice elements of adjacent honeycombs are not glued to one another, a planned weak point thus results within the lattice structure.

It is advantageous if at least one loose contact point or a gap, respectively, is arranged within the lattice structure. The honeycomb core can thus be manipulated in a simple manner, because no loose lattice elements arise at the edge, which could bend or break off.

It is particularly advantageous if a plurality of loose contact points or gaps, respectively, are distributed two-dimensionally over the lattice structure. In this manner, zones of different stiffnesses can be formed on the honeycomb core or on the sandwich panel, respectively. For example, an engine hood which comprises such a honeycomb core can be embodied as particularly soft where the probability is particularly high that a pedestrian, who the vehicle runs into, will strike with his head.

The above embodiments and refinements of the invention may be combined arbitrarily.

DRAWINGS

The present invention will be explained in greater detail hereafter on the basis of the exemplary embodiments indicated in the schematic figures of the drawing. In the figures.

DESCRIPTION

Figure 1:
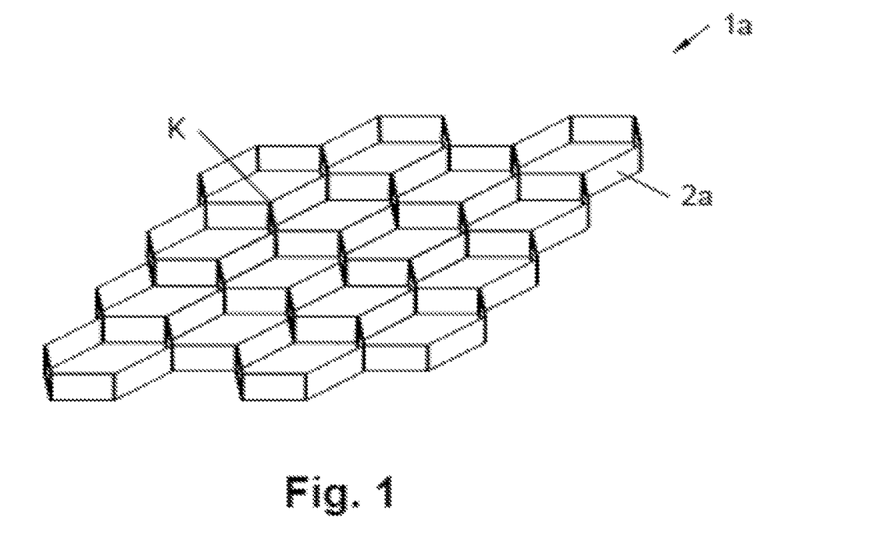
FIG. 1 illustrates a honeycomb core having polygonal honeycombs in an inclined view.

FIG. 1 illustrates a honeycomb core $1a$ having a lattice structure, which consists of a plurality of lattice elements $2a$, which are connected to one another at nodal points K. In this example, the honeycomb core $1a$ or its lattice structure comprises polygonal honeycombs, specifically hexagonal honeycombs.

Figure 2:
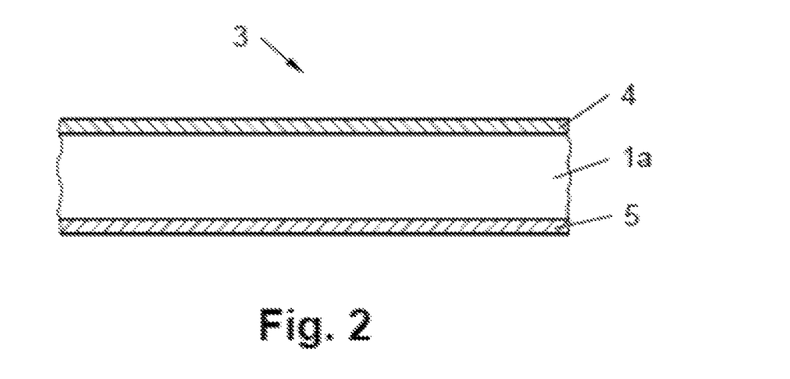
FIG. 2 illustrates a sandwich panel having such a honeycomb core in section.

FIG. 2 illustrates a sandwich panel 3, comprising the honeycomb core $1a$ and cover layers 4 and 5 connected thereto.

In order to control the stiffness of the honeycomb core $1a$ or the sandwich panel 3, a resin-impregnated matrix, which is part of the lattice structure, is impregnated inhomogeneously with the resin. If the honeycomb core $1a$ or the sandwich panel 3, which comprises the honeycomb core $1a$, respectively, is subjected to a load, this mentioned inhomogeneity has the result that the honeycomb core $1a$/the sandwich panel 3 deforms in different ways.

For this purpose, the matrix can be brought into contact with a resin or a plurality of resins:

a) only regionally and/or
b) regionally for different lengths of time and/or
c) regionally at different strengths.

Figure 3:
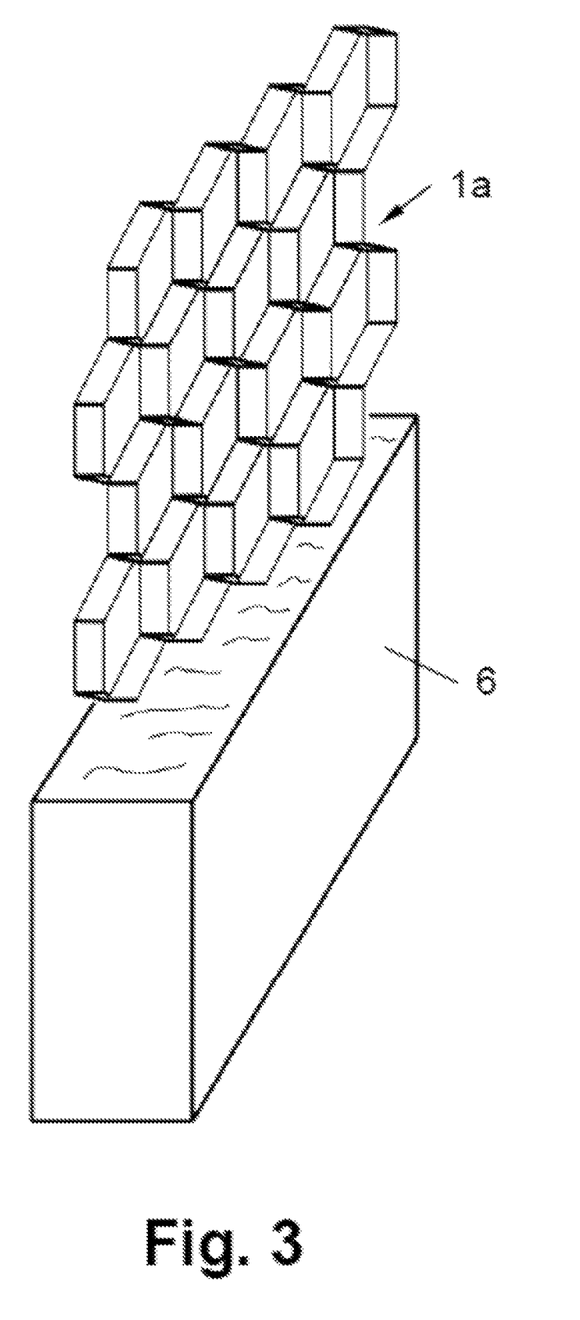
FIG. 3 illustrates a honeycomb core which is immersed upright in a container filled with resin.
Figure 4:
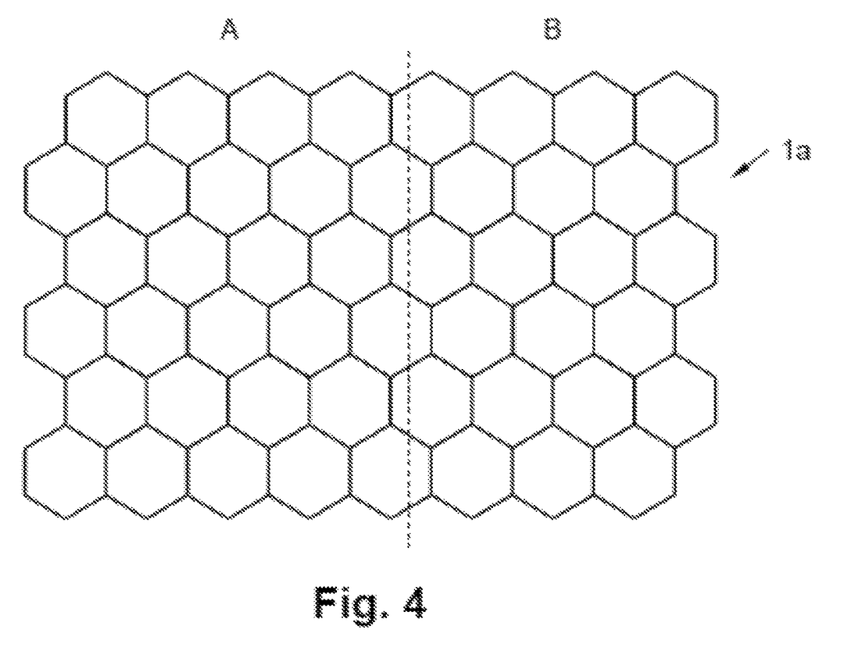
FIG. 4 illustrates a honeycomb core regionally impregnated with resin.

For example, the matrix can be immersed for this purpose in a container 6 filled with resin, as illustrated in FIG. 3. If the matrix is only partially immersed, the matrix is therefore only regionally impregnated with resin. In this manner, a honeycomb core can be produced which is impregnated in a region A with resin, but is not impregnated in a region B, as illustrated in FIG. 4, for example. It would also be conceivable to impregnate the region B with another resin in a further step. Of course, regions which were brought into contact with different resins can also overlap.

Figure 5:
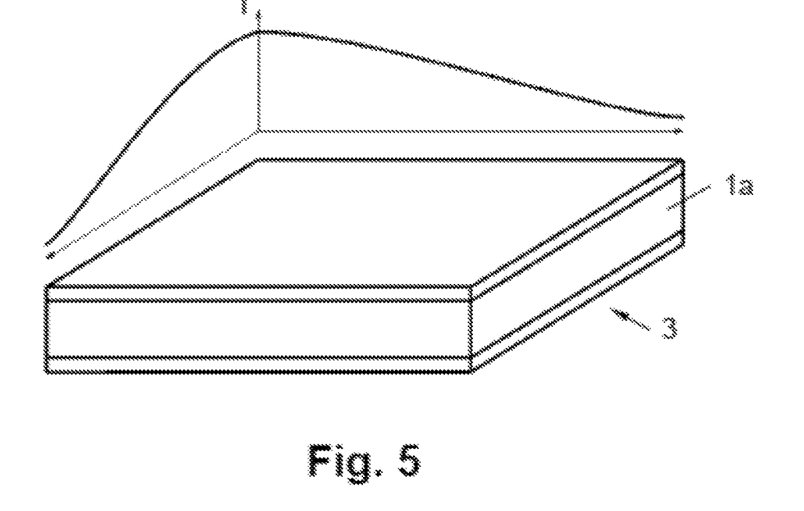
FIG. 5 illustrates a honeycomb core in which the impregnation of the honeycomb core with a resin is distributed inhomogeneously over the surface.

Furthermore, a movement of the matrix during the immersion procedure can be used for the purpose of impregnating it inhomogeneously. For example, the matrix can be immersed completely in the resin and withdrawn therefrom again at different speeds and also continuously or discontinuously. Of course, the movement during the immersion into the container 6 can also be varied. In this manner, the matrix is regionally brought into contact with the resin for different lengths of time, so that the resin is deposited differently in the matrix. FIG. 5 illustrates an example of how the intensity I of the resin can be distributed over the honeycomb core $1a$ or the sandwich panel 3, respectively.

As is clearly obvious from FIG. 5, the inhomogeneity is distributed two-dimensionally over the lattice structure. Of course, this method can also be applied with different resins.

Figure 6:
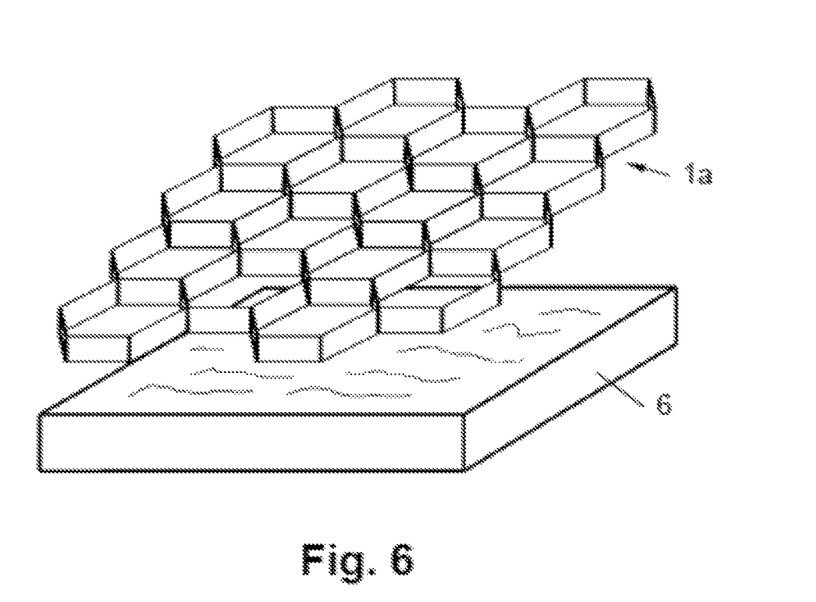
FIG. 6 illustrates a honeycomb core which is immersed horizontally in a container filled with resin.

FIG. 6 illustrates a further method, in which the matrix is immersed horizontally in a container 6 filled with resin. Similarly to the method described in FIGS. 4 and 5, the matrix can also be only partially immersed, in order to impregnate the matrix only regionally. Similarly, a movement of the matrix during the immersion procedure can be varied. In this manner, the matrix is again brought into contact with the resin for different lengths of time, so that the resin is deposited differently in the matrix.

Figure 7:
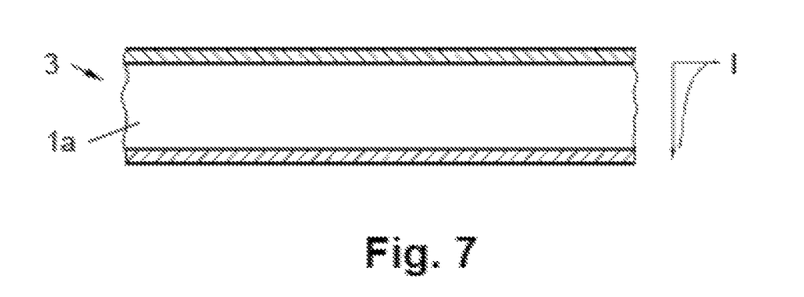
FIG. 7 illustrates a sandwich panel in which the impregnation of the honeycomb core with a resin is distributed inhomogeneously over its height.

FIG. 7 illustrates an example of how the intensity I of the resin can be distributed over the honeycomb core $1a$ or the sandwich panel 3, respectively. As is clearly obvious from FIG. 7, the inhomogeneity is distributed over the height of the honeycomb core $1a$.

Figure 8:
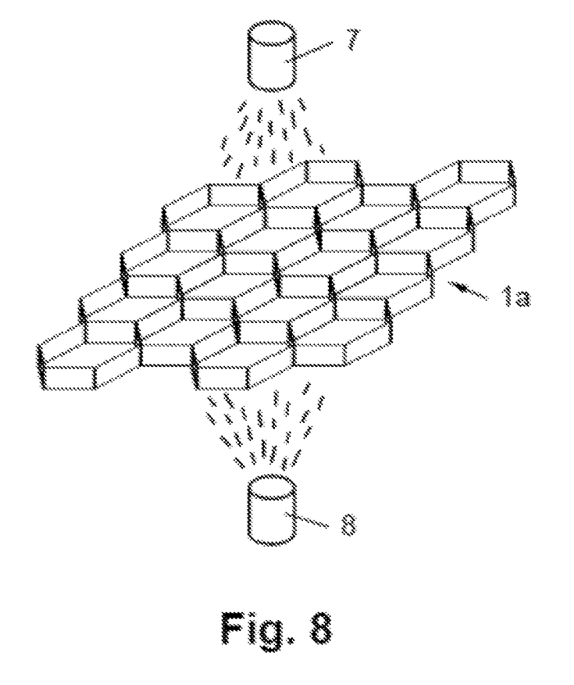
FIG. 8 illustrates a honeycomb core which is sprayed with resin.

FIG. 8 illustrates a further method, in which the matrix is sprayed with resin by two spray heads 7 and 8. In this manner, the matrix is brought into contact with a resin regionally at different strengths. For example, the resin accumulates in the edge regions of the matrix, which face toward the spray heads 7 and 8, more strongly than in the middle. Of course, it is also conceivable that the spray head 7 applies a different resin than the spray head 8. Inhomogeneous impregnation can also be controlled over the surface of the honeycomb core $1a$ by horizontal movement of the matrix.

It is to be noted here that the above-described variants can be combined with one another arbitrarily. For example, a matrix can be immersed in one resin and sprayed with another resin.

The above examples were explained on the basis of a honeycomb core $1a$ having hexagonal honeycombs. Of course, the use thereof is not obligatory. It is also possible, of course, to use polygonal honeycombs having a different number of corners. In particular, it is also possible to combine different polygons with one another, for example, hexagons with rectangles.

Figure 9:
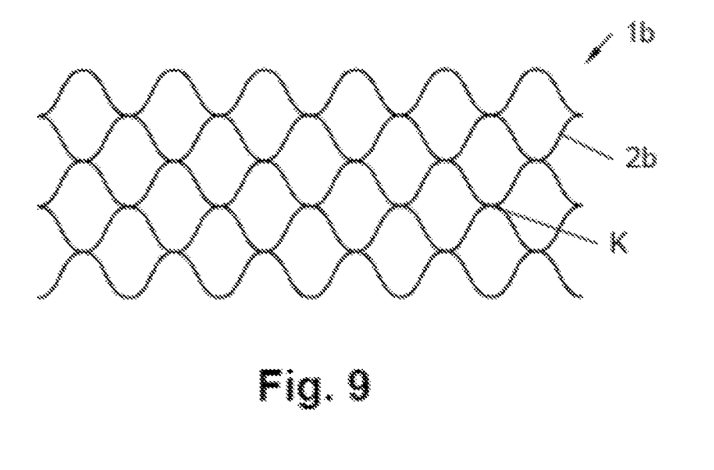
FIG. 9 illustrates a honeycomb core having corrugated strips.

FIG. 9 illustrates a further variant of a honeycomb core $1b$, in which the lattice structure comprises corrugated strips. Individual corrugated strips are typically connected to one another during the production of such a structure, however, this lattice structure can also be understood geometrically so that it consists of a plurality of lattice elements 2b, which are connected to one another at nodal points K.

Figure 10:
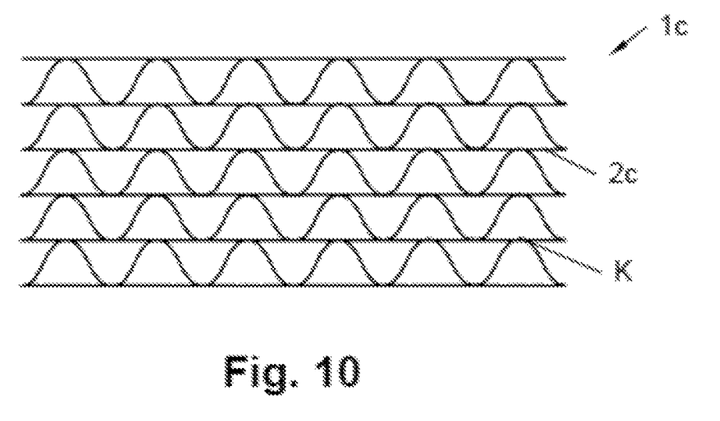
FIG. 10 illustrates a honeycomb core having corrugated strips and linear strips arranged between them.

FIG. 10 illustrates a honeycomb core 1c having a lattice structure which comprises corrugated strips having linear strips arranged between them. This lattice structure can also be understood so that it consists of a plurality of lattice elements 2a, which are connected to one another at nodal points K.

In principle, the cover layers 4 and 5 can also be applied inhomogeneously to a honeycomb core 1a . . . 1c during the production of a sandwich panel 3, for example, by differing distribution of an adhesive provided for this purpose. This can be omitted in most cases due to the inhomogeneous impregnation of the honeycomb core 1a . . . 1c, however, so that the production of a sandwich panel 3 is simplified. The matrix preferably consists of a substantially homogeneous material, whereby it can also be produced in a simple manner.

In order to control the stiffness of a honeycomb core 1a . . . 1c or a sandwich panel 3, respectively, additionally or alternatively to the inhomogeneous impregnation of the lattice structure with a resin, it can also be provided that at least one lattice element only loosely touches an adjacent lattice element or that a gap is provided between them or that one lattice element is interrupted. This means that the mentioned lattice elements are not connected to one another. If the honeycomb core 1a or the sandwich panel 3, which comprises the honeycomb core 1a, respectively, is subjected to a load in a direction which is in the plane of the drawing of FIG. 4, these non-connected lattice elements thus have the result that the honeycomb core 1a/the sandwich panel 3 is particularly soft at this point. The stiffness of the honeycomb core 1a/the sandwich panel 3 can be controlled well in this manner. If the honeycomb core 1a/the sandwich panel 3 is loaded normally to the mentioned plane of the drawing, the stiffness thereof does not differ or only differs slightly from the stiffness of a honeycomb core/a sandwich panel which does not have such interruptions.

Figure 11:
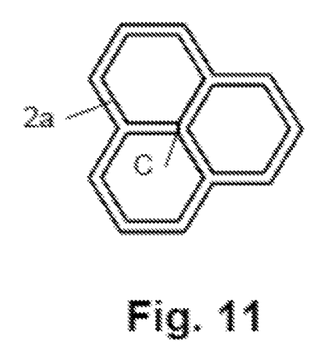
FIG. 11 illustrates a detail of a honeycomb core in which a lattice element only loosely touches the adjacent lattice elements at a contact point.

FIG. 11 illustrates a detail from a honeycomb core having hexagonal honeycombs for this purpose, in which one lattice element 2a only loosely touches the adjacent lattice elements 2a at the contact point C.

Figure 12:
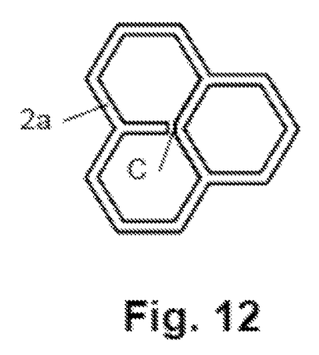
FIG. 12 illustrates the honeycomb core of FIG. 11, but with a gap.

A gap is additionally implemented at the point C in FIG. 12.

Figure 13:
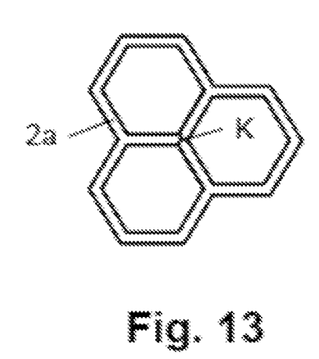
FIG. 13 illustrates a detail of a honeycomb core in which all lattice elements of a node only loosely touch one another.

FIG. 13 illustrates a detail from a further honeycomb core, which has a nodal point K, at which all lattice elements 2a which form this nodal point K only loosely touch one another.

Figure 14:
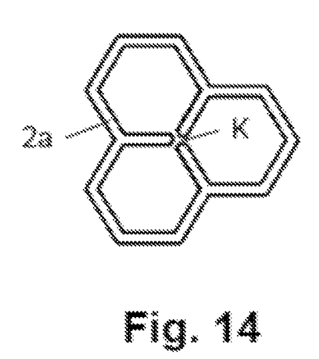
FIG. 14 illustrates the honeycomb core of FIG. 13, but with a gap.

In addition, a gap is provided between the lattice elements in FIG. 14.

Figure 15:
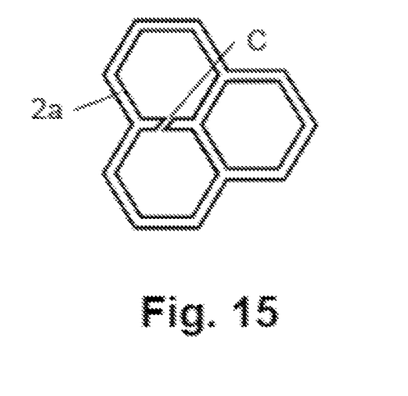
FIG. 15 illustrates a detail of a honeycomb core having an interrupted lattice element.

FIG. 15 illustrates a detail from a honeycomb core in which one lattice element 2a is interrupted at the point C. In addition, the ends of the affected lattice element 2a are bevelled, so that they can slide past one another more easily in the event of a pressure load. This is not necessarily the case, however, the ends can also be implemented as linear. Vice versa, the interruptions illustrated in FIGS. 11 to 14 can also be bevelled.

Figure 16:
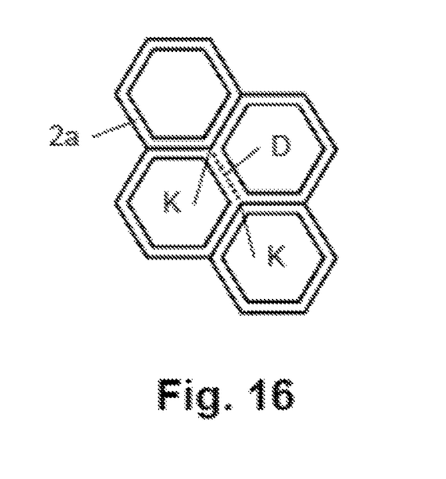
FIG. 16 illustrates a detail of a honeycomb core in which lattice elements extending in parallel between two adjacent nodal points only touch one another loosely.

FIG. 16 illustrates a detail from a honeycomb core in which lattice elements 2a extending in parallel between two adjacent nodal points only touch one another loosely. This is the case at the contact point D (illustrated by a dotted line). Alternatively, a gap can also be provided at the point D.

Figure 17:
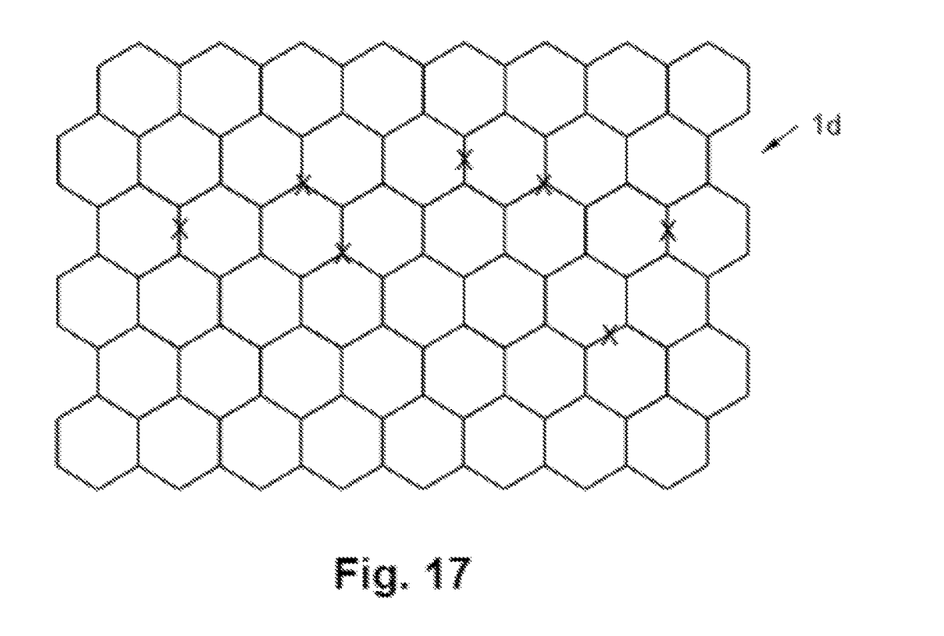
FIG. 17 illustrates a honeycomb core having interruptions distributed over the surface.

FIG. 17 illustrates an example of how the interruptions marked with a "X" can be distributed two-dimensionally over the lattice structure of a honeycomb core 1d. In FIG. 17, the interruptions X are distributed irregularly, however, they can also be distributed regularly depending on the application, of course. In FIG. 17, the interruptions X are furthermore arranged within the lattice structure, so that no loose lattice elements 2a arise at the edge of the lattice structure. It is also obvious from FIG. 17 that the honeycomb core 1d is implemented in one piece. In this manner, the manipulation thereof, or also the production of the sandwich panel 3, is particularly simple.

The above examples were explained on the basis of a honeycomb core 1a having hexagonal honeycombs. The use thereof is not obligatory, of course. It is also possible, of course, to use polygonal honeycombs having a different number of corners. Finally, lattice structures having corrugated strips (FIG. 9) or having corrugated strips having linear strips arranged between them (FIG. 10) can also have such interruptions. For example, such a lattice structure can be produced in that no adhesive is applied at the affected nodal points K during the gluing of the strips. In this case, respectively two lattice elements 2b, 2c of the four lattice elements 2b, 2c delimiting this nodal point K are connected to one another.

The measures illustrated in the figures can be combined arbitrarily. For example, the honeycomb core 1d from FIG. 17 can be impregnated with resin in the same manner as the honeycomb core 1a from FIG. 4. Or, a honeycomb core as illustrated in FIG. 14 can be sprayed with resin as illustrated in FIG. 8. A person skilled in the art can apply the disclosed teaching readily to further examples.

A honeycomb core 1a . . . 1d or a sandwich panel 3 can be used in vehicle construction, for example, as an engine hood or as an interior component, for example. In both cases, it is important that persons are not injured or are not injured severely in the event of an impact on the mentioned components. The measures for controlling the strength of a honeycomb core 1a . . . 1d now offer the possibility of forming an engine hood of a vehicle so it has different stiffnesses in a simple manner. Various zones can thus be formed, at which in all probability a pedestrian will strike with the legs, with the torso, or with the head on the engine hood if a vehicle runs into him. The same applies for an interior component, for example, a dashboard. Zones of various stiffnesses can also be formed thereon in a simple manner.

Finally, it is to be noted that the parts of the figures are possibly not illustrated to scale and that the individual variants illustrated in the figures can also form the subject matter of an independent invention. Location specifications such as "right," "left," "top," "bottom," and the like relate to the illustrated location of the respective component and are to be mentally adapted accordingly in the event of change of the mentioned location.

What is claimed is:

1. A method of producing a motor vehicle component, the method comprising:
   providing a honeycomb core having a plurality of regions, including a lattice structure having corrugated strips with linear strips arranged therebetween, and a plurality of lattice elements which form a nodal point, each lattice element comprising a matrix; and
   impregnating each matrix by spraying resins of different types at different spray durations and spray intensities inhomogeneously two-dimensionally such that zones of the motor vehicle component located in preselected regions of the honeycomb core have different stiffnesses than other regions based upon a probability of impact in an accident by the motor vehicle.

2. The method of claim 1, further comprising, connecting, after the impregnation of each matrix, cover layers to the honeycomb core.

3. The method of claim 1, wherein impregnating resins comprises impregnating the resins for different lengths of time.

4. A method of producing a motor vehicle component, the method comprising:
providing a honeycomb core having a plurality of regions, including a lattice structure having corrugated strips with linear strips arranged therebetween, and a plurality of lattice elements which form a nodal point, each lattice element comprising a matrix composed of a homogeneous material;
impregnating each matrix, by spraying resins of different types at different spray durations and spray intensities inhomogeneously and two-dimensionally, such that zones of the motor vehicle component located in preselected regions of the honeycomb core have different stiffnesses than other regions based upon a probability of impact in an accident by the motor vehicle.

5. The method of claim 4, further comprising, connecting, after the impregnation of each matrix, cover layers to the honeycomb core.

6. The method of claim 4, wherein each matrix is impregnated such that the inhomogeneity is distributed over the height of the lattice structure.

7. The method of claim 4, wherein the lattice structure comprises polygonal honeycombs.

8. A method of producing a motor vehicle component, the method comprising:
connecting cover layers, including an outer layer and an inner layer, to a honeycomb core having a plurality of regions arranged between the cover layers, the honeycomb core including a lattice structure having corrugated strips with linear strips arranged therebetween, and a plurality of lattice elements which form a nodal point, each lattice elements comprising a matrix composed of a homogeneous material; and
impregnating resins; in each matrix inhomogeneously and two-dimensionally, by spraying resins of different types at different spray durations and spray intensities such that zones of the motor vehicle component located in preselected regions of the honeycomb core have different stiffnesses based upon a probability of impact in an accident by the motor vehicle.

9. The method of claim 8, wherein each matrix is impregnated such that the inhomogeneity is distributed over the height of the lattice structure.

10. The method of claim 8, wherein the lattice structure comprises polygonal honeycombs.

11. The method of claim 8, further comprising providing a gap between the lattice elements at the nodal point.

12. The method of claim 11, wherein the lattice elements are not connected to one another at the gap.

* * * * *